United States Patent [19]

Yoshida

[11] Patent Number: 4,837,766
[45] Date of Patent: Jun. 6, 1989

[54] FRAME STEP-OUT DETECTING SYSTEM

[75] Inventor: Atsushi Yoshida, Tokyo, Japan

[73] Assignee: NEC Corporation, Tokyo, Japan

[21] Appl. No.: 29,556

[22] Filed: Mar. 24, 1987

[30] Foreign Application Priority Data

Mar. 24, 1986 [JP] Japan .................................. 61-63901
Mar. 24, 1986 [JP] Japan .................................. 61-63902

[51] Int. Cl.$^4$ ............................................. G06F 11/10
[52] U.S. Cl. ...................................... 371/46; 371/43;
371/45; 375/17
[58] Field of Search ....................... 371/43, 45, 44, 46,
371/49; 375/17, 42, 53, 54, 56, 57, 83, 111, 118,
114, 116; 380/2

[56] References Cited

U.S. PATENT DOCUMENTS

| 4,077,021 | 2/1978 | Csajka | 332/9 R |
|---|---|---|---|
| 4,527,279 | 7/1985 | Yasuda | 371/46 |
| 4,539,684 | 9/1985 | Kloker | 371/46 |
| 4,578,800 | 3/1986 | Yasuda | 371/46 |
| 4,583,236 | 4/1986 | Kromer | 371/46 |
| 4,601,044 | 7/1986 | Kromer | 371/46 |
| 4,639,548 | 1/1987 | Oshima | 371/46 |
| 4,675,871 | 6/1987 | Gorden | 371/46 |

OTHER PUBLICATIONS

Proceedings of the IEEE, vol. 61, No. 3, Mar. 1973, "The Viterbi Algorithm".

Primary Examiner—Michael R. Fleming
Attorney, Agent, or Firm—Sughrue, Mion, Zinn, Macpeak & Seas

[57] ABSTRACT

A frame step-out detecting system includes on the transmission side, a first violation unit, a modulating means and, on the reception side, a demodulating means, a second violation unit, and an error detector. The first violation unit includes a convolutional encoder and subjects data to be transmitted to violation. The modulating means modulates a carrier by an output from the first violation unit and outputs it to a transmission path. The demodulating means demodulates a signal supplied from the transmission path. The second violation unit includes a Viterbi decoder and subjects an output signal from the demodulating means to violation. The error detector monitors an internal state of the second violation unit, detects a step-out of violation in the first and second violation units, and outputs a signal representing frame step-out.

6 Claims, 3 Drawing Sheets

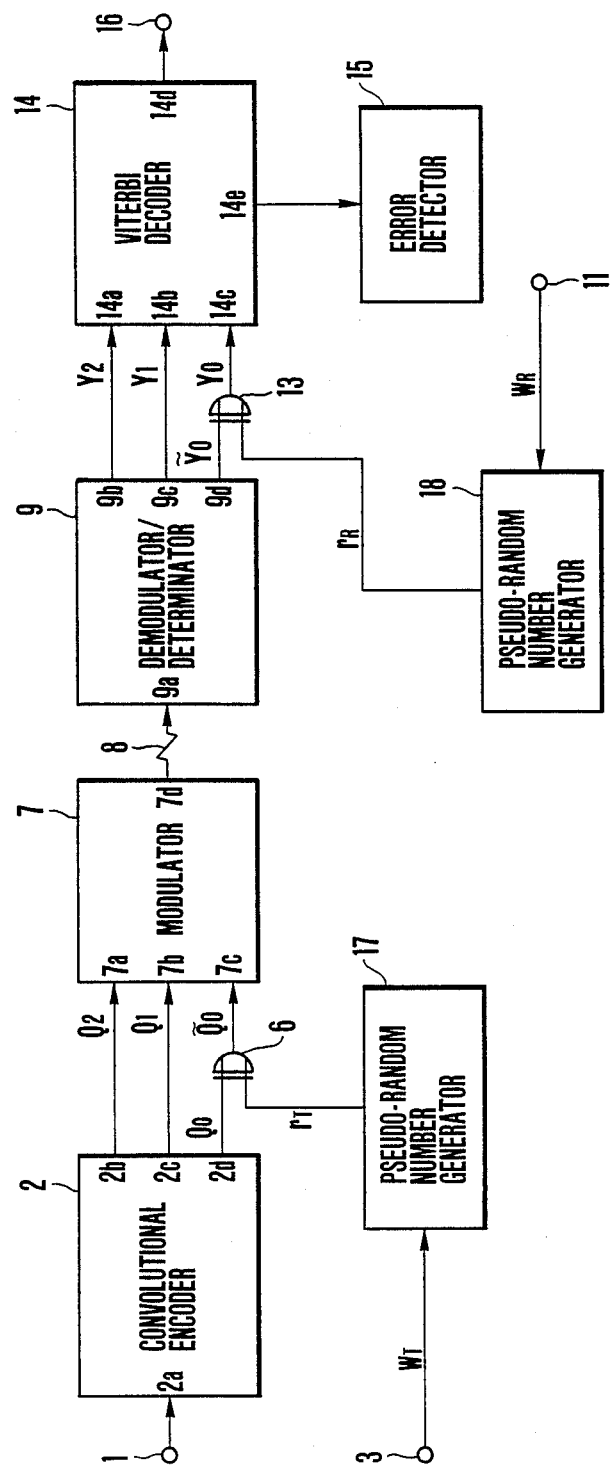
F I G. 2

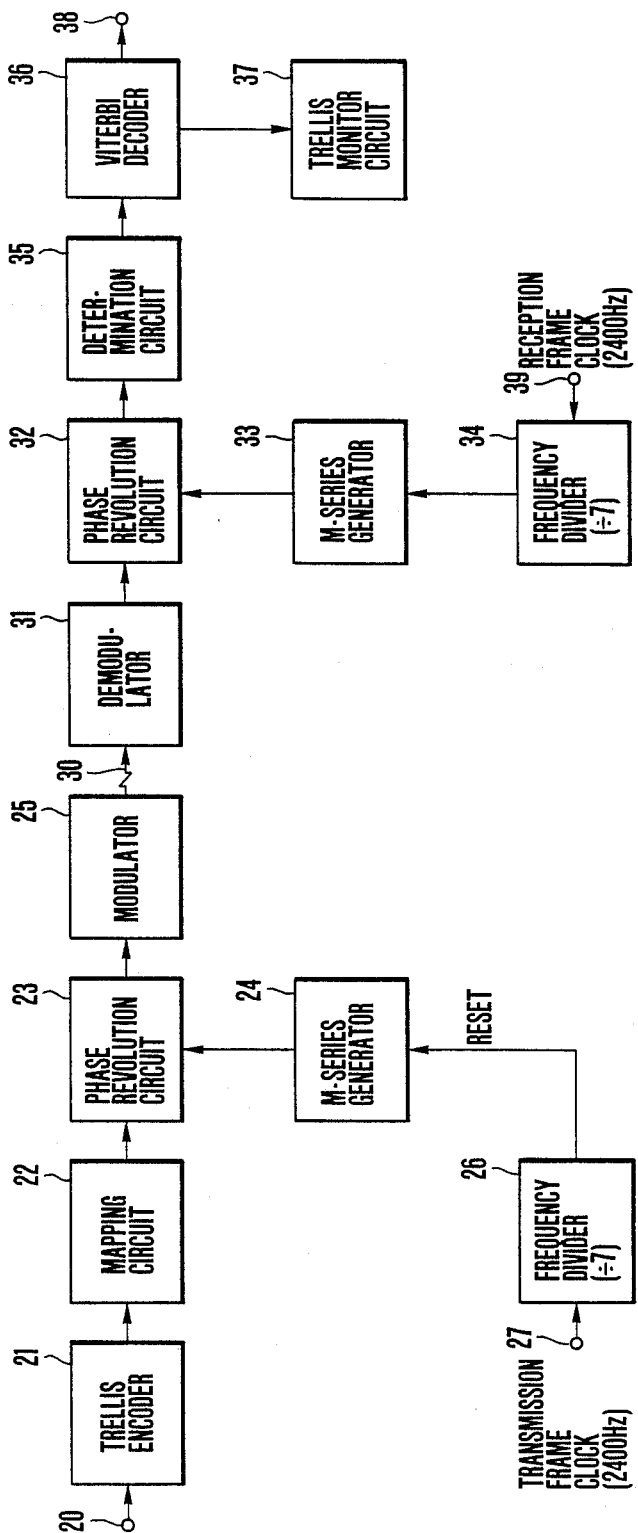
F I G. 3

FRAME STEP-OUT DETECTING SYSTEM

BACKGROUND OF THE INVENTION

The present invention relates to a frame step-out detecting system in data transmission and, more particularly, to a frame step-out detecting system in a transmission system using a convolutional code.

In a digital communication system, the transmission speeds (bit rates) of N parallel channels connected to both ends of a transmission path are an integer multiple of 2,400 Hz, respectively. The frame clock of a multiplexer and a demultiplexer for connecting these low-rate channels to a modulator and demodulator have a frequency 2,400 Hz. When the transmission path of the communication system has a transmission speed of 14.4 kbps (kilo bit per second) or less, the modulation and demodulation speeds of the MODEM are 2,400 Hz, and the modulator and the demodulator use clock signals commonly with the corresponding multiplexer and the demultiplexer, respectively. In this case, the modulation clock of the transmission side and the demodulation clock of the reception side are synchronized when the demodulator receives data correctly. At the same time, the frame clocks of the transmission side multiplexer and the reception side demultiplexer are also automatically synchronized. Therefore, no particular synchronizing means is needed.

When the transmission speed is larger than the above value, however, e.g., when the system has a transmission speed of 19.2 kbps, the modulation and demodulation speeds are 19,200÷7=2,742.85 Hz since transmission is performed in units of 7 bits, and the modulator and the demodulator cannot use clock signals commonly with the corresponding multiplexer and the demultiplexer, respectively. In this case, a synchronizing means is needed since the multiplexer and the demultiplexer are not automatically synchronized with each other even when the modulator and the demodulator are synchronized with each other.

Conventionally, a frame step-out detecting means in data transmission detects frame step-out by inserting a frame sync signal having a specific pattern into a data string to be transmitted. Since such conventional frame step-out detecting system inserts the frame sync signal which does not have data to be transmitted, the data transmission speed is always lower than the transmission speed in a transmission path. This poses a critical problem in a system wherein data transmission is performed with a maximum communication capacity of a transmission path, as in data transmission using a telephone network.

SUMMARY OF THE INVENTION

It is a object of the present invention to provide a frame step-out detecting system which detects frame step-out without inserting the frame sync signal.

The frame step-out detecting system according to the present invention comprises: on a transmission side, first violation means for subjecting data to be transmitted to violation, and modulating means for modulating a carrier by an output from the first violation means and outputting it to a transmission path; and on a reception side, demodulating means for demodulating a signal supplied from the transmission path, second violation means for subjecting an output signal from the demodulating means to violation, and error detecting means for monitoring an internal state of the second violation means, detecting a step-out of violation in the first and second violation means, and outputting a signal representing a frame step-out.

BRIEF DESCRIPTION OF THE DRAWINGS

FIG. 2 is a block diagram of another embodiment of the present invention; and

FIG. 3 is a block diagram of still another embodiment of the present invention.

DETAILED DESCRIPTION OF THE PREFERRED EMBODIMENTS

Figure 1:
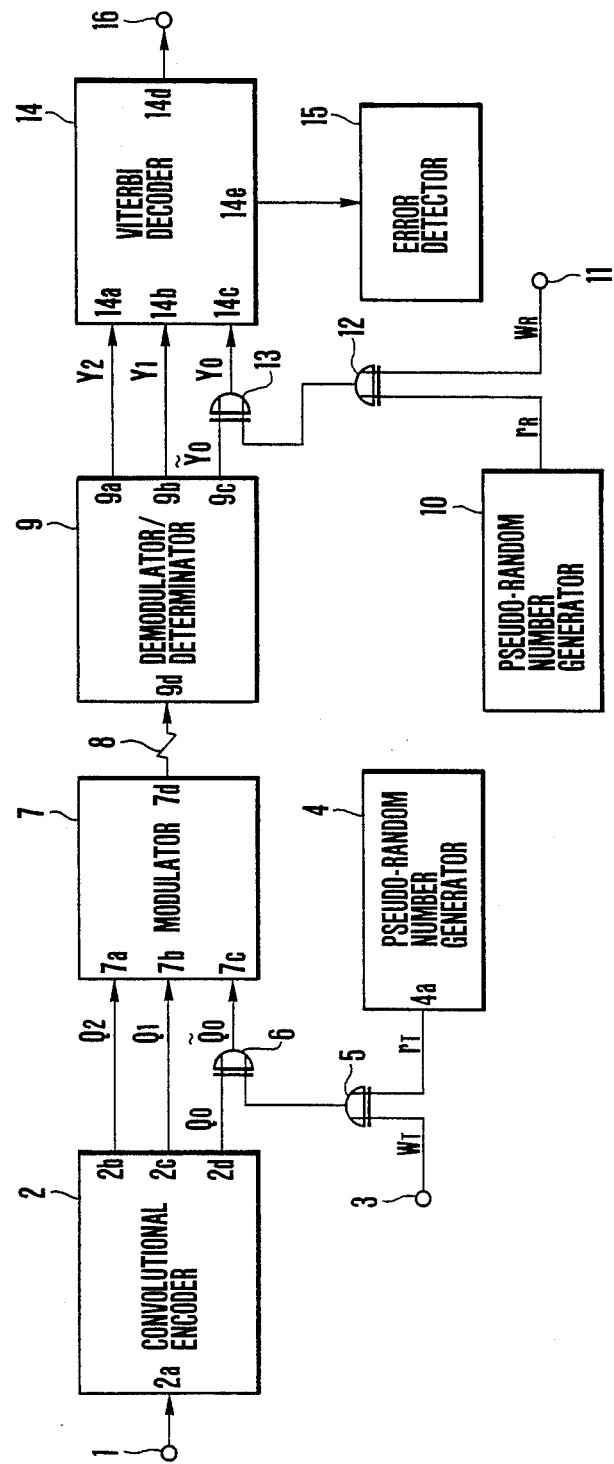
FIG. 1 is a block diagram of an embodiment of the present invention.

The embodiments of the present invention will be described in detail with reference to the accompanying drawings.

FIG. 1 is a block diagram of a frame step-out detecting system according to an embodiment of the present invention.

In FIG. 1, data to be transmitted is input to an input terminal 1 and is subjected to violation so that, when a frame step-out occurs, data of the reception side always includes an error. Referring to FIG. 1, a data signal to be transmitted is input from the input terminal 1 and input to an input terminal 2a of a convolutional encoder 2. The convolutional encoder 2 uses, e.g., a circuit described in U.S. Pat. No. 4,077,021. The convolutional encoder 2 encodes an input signal to a data word (Q2, Q1, Q0) consisting of 3 bits and outputs the bits Q2, Q1, and Q0 in a parallel manner from its output terminals 2b, 2c, and 2d, respectively. The output terminals 2b and 2c of the convolutional encoder 2 are directly connected to input terminals 7a and 7b of a modulator 7, and its output terminal 2d is connected to one input terminal of an exclusive OR circuit 6. The other input terminal and the output terminal of the exclusive OR circuit 6 are connected to the output terminal of an exclusive OR circuit 5 and an input terminal 7c of the modulator 7, respectively.

One input terminal of the exclusive OR circuit 5 is connected to an input terminal 3 which receives a transmission frame sync signal WT synchronized with the data signal. The other input terminal of the exclusive OR circuit 5 is connected to an output terminal 4a of a pseudo-random number generator 4.

An output terminal 7d of the modulator 7 is connected to one end of a transmission path 8, and the other end of the transmission path 8 is connected to an input terminal 9d of a reception side demodulator/determinator 9. The demodulator/determinator 9 outputs the bits of demodulated/determinated 3 bits data word (Y2, Y1, Y0) from its corresponding output terminals 9a, 9b, and 9c. The output terminals 9a and 9b of the demodulator/determinator 9 are directly connected to input terminals 14a and 14b of a Viterbi decoder 14. The Viterbi decoder 14 is known as a decoder for a convolutional code and is reported in an article entitled "The Viterbi Algorithm", PROCEEDING OF THE IEEE, Vol. 61, No. 3, March 1973, pp 268–278.

An output terminal 9c of the demodulator/determinator 9 is connected to one input terminal of an exclusive OR circuit 13. The other input terminal of the exclusive OR circuit 13 is connected to the output terminal of an exclusive OR circuit 12. One input terminal of the exclusive OR circuit 12 is connected to the output terminal of a pseudo-random number generator 10 for generating a random number rR of the same series as that generated by the pseudo-random number generator 4. The other input terminal of the exclusive OR circuit 12 is connected to an input terminal 11 for receiving a frame sync signal WR.

One output terminal 14d of the Viterbi decoder 14 is connected to a reception data output terminal 16, and the other output terminal 14e thereof is connected to the input terminal of an error detector 15 for detecting decoding error.

The operation of the frame step-out detecting system shown in FIG. 1 will be described. The convolutional encoder 2 encodes the transmission data received at its input terminal 2a and outputs an output word code (Q2, Q1, Q0) consisting of 3-bit parallel data from its output terminals 2b to 2d. The exclusive OR circuit 5 outputs an exclusive logical sum (WT⊕rT) of the frame sync signal WT and the pseudo-random number rT output from the pseudo-random number generator 4. The exclusive OR circuit 6 outputs a code signal $\overline{Q0}$, which is an exclusive logical sum Q0⊕(WT⊕rT) of a code signal Q0 output from the output terminal 2d of the convolutional encoder 2 and the signal (WT⊕rT). The modulator 7 modulates a carrier signal with the input transmission word (Q2, Q1, $\overline{Q0}$) consisting of 3-bit parallel data and outputs a modulated signal to the transmission path 8. The demodulator/determinator 9 demodulates and determines the signal received via the transmission path 8 and outputs a word (Y2, Y1, $\overline{Y0}$) as 3-bit determination data. The upper 2 bits Y2 and Y1 of the word (Y2, Y1, $\overline{Y0}$) are directly input to the Viterbi decoder 14. At the same time, the exclusive OR circuit 12 outputs an exclusive logical sum (WR⊕rR) of the frame sync signal WR and the pseudo-random number rR output from the pseudo-random number generator 10. The exclusive OR circuit 13 outputs, to the input terminal 14c of the Viterbi decoder 14, a code signal Y0 which is the exclusive logical sum $\overline{Y0}$⊕(WR⊕rR) of the code signal $\overline{Y0}$ output from the output terminal 9c of the demodulator/determinator 9 and the signal (WR⊕rR). In this case, if the phases of the frame sync signals WT and WR of the transmission and reception sides and the phases of the transmission and reception side pseudo-random number generators 4 and 10 are synchronized, the code signal Y0 is equal to Q0, and an error occurs only in the transmission path 8. If the above phases are stepped out, the code signal Y0 is not equal to Q0, and an error occurs. Since this error is greatly larger than an error occurring in the transmission path 8 and continuous, it can be detected by the error detector 15. The error detector 15 can be a circuit which receives a pathmetric from a Viterbi decoder and generates an error detection signal when the rate of increase over time of the minimum value of the pathmetric exceeds a predetermined value, or a circuit which receives a pathmetric from a Viterbi decoder and generates an error detection signal when the difference between the maximum and minimum values of the pathmetric exceeds a predetermined value.

As described above, the phases of the transmission and reception side frame sync signals WT and WR, and the phases of the transmission and reception side pseudo-random number generators 4 and 10 are synchronized. Phase synchronization is performed again when a large, continuous error during transmission is detected by the error detector 15. As a result, a frame step-out can be reliably detected.

FIG. 2 is a block diagram of a frame step-out detecting system according to another embodiment of the present invention.

In FIG. 2, the same portions as in FIG. 1 are denoted by the same reference numerals. The arrangement of FIG. 2 is different from that of FIG. 1 in the following respects. More specifically, on the transmission side, a transmission frame sync signal WT from a terminal 3 is input to a pseudo-random number generator 17. A pseudo-random number rT output from the pseudo-random number generator 17 is input to one input terminal of an exclusive OR circuit 6. On the reception side, a reception frame sync signal WR from a terminal 11 is input to a pseudo-random number generator 18. A pseudo-random number rR output from the pseudo-random number generator 18 is input to one input terminal of an exclusive OR circuit 13.

The operation of the frame step-out detecting system of the arrangement shown in FIG. 2 will be described. A convolutional encoder 2 encodes transmission data received at its input terminal 2a and outputs an output word (Q2, Q1, Q0) consisting of 3-bit code parallel data from its output terminals 2b to 2d. The exclusive OR circuit 6 outputs a code signal $\overline{Q0}$ which is an exclusive logical sum (Q0⊕rT) of the code signal Q0 and the pseudo-random number rT output from the pseudo-random number generator 17. Therefore, a modulator 7 modulates a carrier signal with a transmission word (Q2, Q1, $\overline{Q0}$) of input 3-bit parallel data and outputs a modulated signal to a transmission path 8. A demodulator/determinator 9 demodulates and determines the signal received via the transmission path 8 and outputs an input word (Y2, Y1, Y0) which is 3-bit determination data. The exclusive OR circuit 13 outputs a code signal Y0 which is an exclusive logical sum ($\overline{Y0}$⊕rR) of the code signal $\overline{Y0}$ and the pseudo-random number rR output from a pseudo-random number generator 18. In this case, when the transmission and reception side frame sync signals WT and WR are synchronized, the code signal Y0 is equal to Q0, and an error occurs only on the transmission path 8. When a step-out occurs, the code signal Y0 is not equal to Q0, and an error occurs. Since this error is greatly larger than an error occurring in the transmission path 8 and continuous, it can be detected by an error detector 15, in the same manner as in FIG. 1.

In the embodiments of FIGS. 1 and 2, the output word from the convolutional encoder 2 and the input word to the demodulator/determinator 9 are 3-bit data. However, the present invention is not limited to this.

FIG. 3 is a block diagram of a frame step-out detecting system according to still another embodiment of the present invention. In this embodiment, 16×16 matrix dots are transmitted at a transmission speed of 2,743 Hz (2,400×8/7) on a transmission path.

Data to be transmitted is input from an input terminal 20 and is encoded by a trellis encoder 21 to a predetermined trellis code. An output from the trellis encoder 21 is input to a mapping circuit 22. Mapping is performed such that the trellis state is disordered whenever the phase of the carrier is revolved by N×90° by the mapping circuit 22, i.e., when the point arrangement of the data is revolved by N×90°. An output from the mapping circuit 22 is supplied to a phase revolution circuit 23 and is phase-revolved in accordance with an input from an M-series generator 24. A 2,400-Hz frame clock is supplied from a terminal 27 to a frequency divider which performs 1/7 frequency division, and a 342-Hz reset signal from the frequency divider 26 is supplied to the M-series generator 24. The M-series generator 24 outputs bits at a rate of 2 bits/baud. When the 2 bits are 00, 01, 10, and 11, phase revolution of 0°, +90°, +180°, and +270° are performed by the phase revolution circuit 22, respectively. A modulator 25 modulates a carrier signal with the output from the phase revolution circuit 23 and transmits a modulated signal onto a transmission path 30.

The signal transmitted via the transmission path 30 is demodulated by a demodulator 31. An output from the demodulator 31 is input to a phase revolution circuit 32 and is phase-revolved by an output from an M-series generator 33. The M-series generator 33 outputs bits in units of 2 bits. When the 2 bits are 00, 01, 10, and 11, phase revolution of 0°, −90°, −180°, and −270° are performed by the phase revolution circuit 32, respectively. A 342-Hz signal output from a frequency divider 34 is supplied to the M-series generator 33 as a reset signal. The frequency divider 34 frequency-divides a 2,400-Hz reception frame clock by 7.

An output from the phase revolution circuit 32 is supplied to a determinator 35 to be determined in a predetermined manner, and is decoded by a Viterbi decoder 36. An output from the Viterbi decoder 36 is supplied to a terminal 38. The state of the Viterbi decoder 36 is monitored by a trellis monitor circuit 37. When the transmission and reception side M-series phases coincide, i.e., when the phases of the transmission and reception side frame clock coincide, the trellis monitor circuit 37 determines that the trellis state is normal and no error has occurred.

As described above in detail, according to the frame step-out detecting system of the present invention, transmission data is subjected to violation. Therefore, when a frame step-out occurs, an error always occurs in reception data, and a reception error can thus be reliably detected. A frame step-out can be reliably detected without using a frame sync signal and without decreasing the transmission speed.

What is claimed is:

1. A frame step-out detecting means comprising:
on a transmission side, a convolutional encoder for encoding data to be transmitted into a N-bit convolutional code and outputting N−1 bits of the convolutional code to a modulating means, a first pseudo-random number generator for generating a first pseudo-random number, a first exclusive OR circuit for obtaining an exclusive logical sum of the first pseudo-random number of a transmission frame sync signal, a second exclusive OR circuit for obtaining an exclusive logical sum of an output from said first exclusive OR circuit and the remaining 1 bit of the N-bit output from said convolutional encoder, said modulating means for receiving the N−1 bits of the N-bit output from said convolutional encoder and an output bit from said second exclusive OR circuit and modulating a carrier thereby;
a transmission path for transmitting an output from said modulating means to a reception side; and
on the reception side, demodulating means for demodulating a transmission signal from said transmission path and outputting N parallel bits, N−1 of those bits being applied directly to a Viterbi decoder, a second pseudo-random number generator for generating a second pseudo-random number, a third exclusive OR circuit for obtaining an exclusive logical sum of a reception frame sync signal and the second pseudo-random number, a fourth exclusive OR circuit for obtaining an exclusive logical sum of the remaining 1 bit of the N-bit output from said demodulating means and an output from said third exclusive OR circuit, said Viterbi decoder for receiving the N−1 bits of the N-bit output from said demodulating means and an output bit from said fourth exclusive OR circuit, decoding them, and outputting reception data, and means for monitoring an internal state of said Viterbi decoder and detecting a frame step-out.

2. A frame step-out detecting system comprising:
on a transmission side, a convolutional encoder for encoding transmission data to an N-bit convolutional code N−1 bits of said convolutional code being output to a modulating means, a first pseudo-random number generator for generating a first pseudo-random number in response to a transmission frame sync signal, a first exclusive OR circuit for obtaining an exclusive logical sum of the remaining i bit of the N-bit output from said convolutional encoder and the first pseudo-random number, said modulating means for receiving the N−1 bits of the N-bit output from said convolutional encoder and an output bit from said first exclusive OR circuit and modulating a carrier thereby;
a transmission path for transmitting an output from said modulating means to a reception side; and
on the reception side, demodulating means for demodulating the transmission data from said transmission path and outputting N parallel bits, N−1 of those bits being applied directly to a Viterbi decoder, a second pseudo-random number generator for generating a second pseudo-random number, a second pseudo-random number, said Viterbi decoder for receiving the N−1 bits of the N-bit output from said demodulating means and an output bit from said second exclusive OR circuit for obtaining an exclusive logical sum of the remaining 1 bit of the N-bit output from said demodulating means and the second exclusive OR circuit, decoding them, and outputting reception data, and means for monitoring an internal state of said Viterbi decoder and detecting a frame step-out.

3. A frame step-out detecting system comprising:
on a transmission side, an encoder for encoding data to be transmitted in accordance with a predetermined trellis, mapping means for mapping an output from said encoder such that the trellis state is disordered whenever the phase of a transmission carrier is revolved by an integer multiple of 90°, first phase revolution means for subjecting an output from said mapping means to M1×90° phase revolution where M1 (M2 is zero or a positive integer) is indicated by a first control signal, first phase revolution controlling means for supplying the first control signal to said first phase revolution means, a first frequency divider for frequency-dividing a transmission frame clock signal and supplying it to said first phase revolution controlling means as a reset signal, and modulating means for modulating the carrier by an output from said first phase revolution means and transmitting it onto a transmission path; and
on a reception side, demodulating means for demodulating the transmission data from said transmission path, second phase revolution means for subjecting an output from said demodulating means to M2×90° phase revolution where M2 (M2 is zero or a positive integer) is indicated by a second control signal, second phase revolution means, a second control signal to said second phase revolution means, a second frequency divider for frequency-dividing a reception frame clock signal with the same frequency dividing ratio as that of said first frequency divider and supplying it to said second phase revolution controlling means as a reset signal, a Viterbi decoder for decoding an output from said second phase revolution means and outputting it as reception data, and a monitor circuit for detecting a frame step-out from an internal state of said Viterbi decoder.

4. A frame step-out detecting system comprising:
on a transmission side, first violation means for subjecting data to be transmitted to violation, and modulating means for modulating a carrier by an output from said first violation means and outputting a modulated signal to a transmission path; and
on a reception side, demodulating means for demodulating the signal supplied from said transmission path, second violation means for subjecting an output signal from said demodulating means to violation, and error detecting means for monitoring an internal state of said second violation means, detecting a step-out of violation in said first and second violation means, and outputting a signal representing a frame step-out;
wherein said first violation means comprises a convolutional encoder for receiving the data to be transmitted, encoding it to an N-bit convolutional code, and outputting part of the constituent bits of the convolutional code to said modulating means as part of an input thereto, means for receiving a transmission from sync signal, a first pseudo-random number generator for generating a first pseudo-random number, a first exclusive OR circuit for obtaining an exclusive logical sum of the first pseudo-random number and a transmission frame sync signal, and a second exclusive OR circuit for obtaining an exclusive logical sum of the output from said first exclusive OR circuit and the remaining bits of the N-bit code output from said convolutional encoder and outputting it to said modulating means as the remaining part of the input thereto; and
said second violation means comprises a Viterbi decoder for receiving a part of the output bits from said demodulating means as part of an input thereto, a second pseudo-random number generator for generating a second pseudo-random number to be synchronized with the phase of said first pseudo-random number means for receiving a reception frame sync signal to be in synchronism with the phase of said transmission frame sync signal a third exclusive OR circuit for obtaining an exclusive logical sum of the second pseudo-random number and a reception frame sync signal, and a fourth exclusive OR circuit for obtaining an exclusive logical sum of the output from said third exclusive OR circuit and the remaining bits of the output bits from said demodulating means and outputting it to said Viterbi decoder as the remaining part of the input thereto;
whereby if the phases of the transmission and reception frame sync signals and the phases of the first and second pseudo-random numbers are not synchronized the remaining bits of said N-bit code are not equal to the output from said fourth exclusive OR circuit and said error detecting means outputs a frame step-out signal.

5. A frame step-out detecting system comprising:
on a transmission side, first violation means for subjecting data to be transmitted to violation, and modulating means for modulating a carrier by an output from said first violation means and outputting a modulated signal to a transmission path; and
on a reception side, demodulating means for demodulating the signal supplied from said transmission path, second violation means for subjecting an output signal from said demodulating means to violation, and error detecting means for monitoring an internal state of said second violation means, detecting a step-out of violation in said first and second violation means, and outputting a signal representing a frame step-out;
wherein said first violation means comprises a convolutional encoder for receiving the data to be transmitted, encoding it to an N-bit convolutional code, and outputting a bit as part of the N-bit convolutional code, and outputting a bit as part of the N-bit output to said modulating means as part of an input thereto, a first pseudo-random number generator for generating a first pseudo-random number in response to a transmission frame sync signal, and a first exclusive OR circuit for obtaining an exclusive logical sum of the first pseudo-random number and the remaining bits of the N-bit output from said convolutional encoder and outputting it as the remaining part of the input to said modulating means; and
said second violation means comprises a Viterbi decoder for receiving a part of the output bits from said demodulating means as part of an input thereto, a second pseudo-random number generator for generating a second pseudo-random number in response to a reception frame sync signal the phase of which is to be in synchronism with the phase of the transmission frame sync signal, and a second exclusive OR circuit for obtaining an exclusive logical sum of the second pseudo-random number and the remaining bits of the outputs bits from said demodulating means and outputting it as the remaining part of the input to said Viterbi decoder;
whereby if the phases of the transmission and reception frame sync signals are not synchronized the remaining bits of the N-bits code are not equal to the bits output from the second exclusive OR circuit and said error detecting means outputs a frame step-out signal.

6. A frame step-out detecting system comprising:
on a transmission side, first violation means for subjecting data to be transmitted to violation, and modulating means for modulating a carrier by an output from said first violation means and outputting a modulated signal to a transmission path; and
on a reception side, demodulating means for demodulating the signal supplied from said transmission path, second violation means for subjecting an output signal from said demodulating means to violation, and error detecting means for monitoring an internal state of said second violation means, detecting a step-out of violation in said first and second violation means, and outputting a signal representing a frame step-out;

wherein said first violation means comprises an encoder for encoding the data to be transmitted in accordance with a predetermined trellis, mapping means for mapping an output from said encoder, first phase revolution means for phase-revolving an output from said mapping means, first phase revolution angle designating means for generating a signal for determining a phase revolution angle of said first phase revolution means, and a first frequency divider for frequency-dividing a transmission frame sync signal and supplying it to said first phase revolution angle designating means as a reset signal; and said second violation means comprises second phase revolution means for phase-revolving the output from said demodulating means, second phase revolution angle designating means for generating a signal for determining a phase revolution angle of said second phase revolution means, a second frequency divider for frequency-dividing a reception frame sync signal, which is to be in synchronism with the transmission frame sync signal, at the same frequency division ratio as that of said first frequency divider, and a Viterbi decoder for decoding an output from said second phase revolution means;

whereby when the phases of said transmission and reception frame sync signals are not in synchronism said error detecting means outputs a frame step-out signal.

* * * * *

UNITED STATES PATENT AND TRADEMARK OFFICE
CERTIFICATE OF CORRECTION

PATENT NO. : 4,837,766

DATED : June 6, 1989

INVENTOR(S) : ATSUSHI YOSHIDA

It is certified that error appears in the above-identified patent and that said Letters Patent is hereby corrected as shown below:

Col. 4, lines 33 delete "YO" and insert --$\tilde{Y}O$--.

ALL OCCURRENCES OF "$Y\bar{O}$" AND "$Q\bar{O}$" SHOULD BE --$\tilde{Y}O$-- AND --$\tilde{Q}O$--.

Col. 6, line 22, delete " i bit" and insert --1 bit--.

Signed and Sealed this

Twenty-fourth Day of April, 1990

Attest:

HARRY F. MANBECK, JR.

*Attesting Officer*   *Commissioner of Patents and Trademarks*